United States Patent Office 3,541,063
Patented Nov. 17, 1970

3,541,063
PROCESS FOR THE POLYMERIZATION OF DIOLE-
FINS WITH A CATALYST COMPRISING ALKYL-
ALUMINUM COMPOUNDS, GROUP III-B OR-
GANO METAL COMPOUNDS AND ORGANOALU-
MINUM FLUORIDE COMPOUNDS
Morford C. Throckmorton and William M. Saltman,
Akron, Ohio, assignors to The Goodyear Tire & Rub-
ber Company, Akron, Ohio, a corporation of Ohio
No Drawing. Filed Dec. 29, 1967, Ser. No. 694,366
Int. Cl. C08d 3/06, 3/10
U.S. Cl. 260—82.1                                10 Claims

ABSTRACT OF THE DISCLOSURE

A method and a catalyst system for the solution polym-
erization of diolefins and/or mixtures of diolefins of
the general formula:

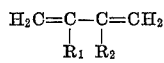

wherein $R_1$ and $R_2$ are selected from the group consist-
ing of hydrogen and alkyl radicals having from one to
twelve carbon atoms, such as butadiene-1,3 or isoprene,
to form polymers containing a high content of cis-1,4
addition, are described. The solution polymerizations are
conducted at conventional temperatures by means of
catalysts comprising (1) a member selected from the class
consisting of alkylaluminum and alkylaluminum hydride
compounds, (2) an organometallic compound, the metal
ion of which is selected from the group consisting of
metals of Group III-B of the Periodic System and (3)
an organoaluminum fluoride compound.

This invention is directed to a method of polymeriza-
tion of diolefins or mixtures of diolefins of the general
formula:

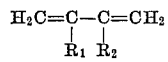

wherein $R_1$ and $R_2$ are selected from the group consisting
of hydrogen and alkyl radicals having from one to twelve
carbon atoms, such as butadiene-1,3 or isoprene, to form
polymers with a high content of cis-1,4 addition. The in-
vention is also directed to catalyst systems useful for this
purpose. The polymers provided by the practice of this
invention have been found to possess properties which
make them useful as synthetic rubbers.

It is an object of this invention to provide a method
whereby butadiene can be polymerized to a high con-
tent of cis-1,4 polybutadiene. Another object is to pro-
vide a method whereby isoprene can be polymerized to a
high content of cis-1,4 polyisoprene. Another object is
to provide a method whereby mixtures of butadiene and
isoprene, mixtures of butadiene and other diolefins de-
fined above, mixtures of isoprene and other diolefins as
defined and mixtures of other diolefins can be polymerized
to form the corresponding copolymers of high cis-1,4
structure. Another object is to provide a catalyst system
by which these polymerizations may be accomplished.
Other objects will become apparent as the description
proceeds.

According to the invention at least one diolefin of the
general formula:

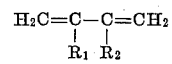

wherein $R_1$ and $R_2$ are selected from the group consist-
ing of hydrogen and alkyl radicals having from 1 to 12
carbon atoms, is polymerized by contact, under solution
polymerization conditions, with a catalyst comprising (1)
a member selected from the class consisting of alkylalumi-
num and alkylaluminum hydride compounds, (2) an or-
ganometallic compound, the metal ion of which is se-
lected from the class consisting of metals of Group III-
B of the Periodic System and (3) an organoaluminum
fluoride compound.

Processes employing organometallic compounds of
Group III-B metals are known to polymerize diolefins.
However, it has been unexpectedly discovered that when
an alkylaluminum fluoride is employed in such a cata-
lyst system, the polymerization of dienes occurs only when
the atom ratio of the fluorine in the alkylaluminum fluo-
ride to the Group III-B metal organocompound is consid-
erably higher than the ratio of chlorine, bromine or iodine
to the Group III-B metal organocompounds described in
the prior art processes.

It has also been discovered in the course of the present
invention that the cis-1,4 content of the resulting polymer,
within a significant structural range, depends upon the
polymerization temperature.

By the term "alkylaluminum" and "alkylaluminum hy-
dride" is meant any compound responding to the formu-
la:

in which $R_1$ is selected from the group consisting of
alkyl (including cycloalkyl), alkoxy, aryl, alkaryl, aryl-
alkyl radicals and hydrogen; $R_2$ and $R_3$ being selected
from the group of alkyl (including cycloalkyl), aryl,
alkaryl, and arylalkyl radicals. Representative of the com-
pounds responding to the formula set forth above are:
diethylaluminum hydride, di-n-propylaluminum hydride,
di-n-butylaluminum hydride, diisobutylaluminum hydride,
diphenylaluminum hydride, di-p-tolylaluminum hydride,
dibenzylaluminum hydride, phenylethylaluminum hydride,
diethylaluminum ethoxide, phenyl-n-propylaluminum hy-
dride, p-tolylethylaluminum hydride, p-tolyl-n-propyl-
aluminum hydride, p-tolyisopropylaluminum hydride,
benzylethylaluminum hydride, benzyl-n-propylaluminum
hydride, and benzylisopropylaluminum hydride and other
organoaluminum hydrides. Also included are diethyl-
ethoxyaluminum and dipropylethoxyaluminum. Also in-
cluded are trimethylaluminum, triethylaluminum, tri-n-
propylaluminum, triisopropylaluminum, tri-n-butylalumi-
num, triisobutylaluminum, tripentylaluminum, trihexyl-
aluminum, tricyclohexylaluminum, trioctylaluminum, tri-
phenylaluminum, tri-p-tolylaluminum, tribenzylaluminum,
ethyldiphenylaluminum, ethyl-di-p-tolylaluminum, ethyldi-
benzylaluminum, diethylphenylaluminum, diethyl-p-tolyl-
aluminum, diethylbenzylaluminum and other triorgano-
aluminum compounds.

The second essential component of the catalyst system
is an organometallic compound of metals of Group III-B
of the Periodic System. The metal ion forms the central
core or atom to which two or more ligand-type groups
or atoms are joined. The resulting complex compound may
be known as a coordination-type compound. For the pres-
ent invention, the most useful of these coordination com-
pounds comprise metals of Group III-B and liquids rep-
resented by organic groups containing from 1 to 20 car-
bon atoms. These compounds may be symbolically repre-
sented as $ML_n$ wherein M represents the metal ion of
Group III-B and L represents the organic ligand and $n$
is an integer of 2 or greater.

Representative Group III–B metals useful in the invention include scandium, yttrium, lanthanum, actinium, cerium, praseodymium, neodymium, promethium, samarium, europium, gadolinium, teribium, dysprosium, holmium, erbium, thulium, ytterbium and lutetium. Of these, cerium, lanthanum and neodymium are preferred.

The organic portion of the coordination compound includes organic-type ligands containing from 1 to 20 carbon atoms. Representative but not exclusive of these organic type ligands are acetic acid, propionic acid, butyric acid, trimethyl acetic acid, 2-ethylhexanoic acid, 2,4-pentanedione, 3-methyl-2,4-pentanedione, 1-ethoxy - 1,3-butanedione, 1,3-diethoxy - 1,3-propanedione, 1,3 - diphenyl - 1,3-propanedione, substituted naphthenic carboxylic acids and the like. Also useful are ligands such as 2-hydroxyquinoline and the like, o-hydroxyaldehydes such as salicylaldehyde and 2-hydroxy-1-naphthaldehyde and the like, o-hydroxyphenons such as 2-hydroxyacetophenone, 2-hydroxybenzophenone and the like, dicarboxylic acids such as oxalic, maleic and o-phthalic and the like, hydroxyesters such as ethyl salicylate, phenyl salicylate and the like, phenolic ethers such as o-hydroxyanisole and the like, and amino-type compounds such as o-aminophenol and salicylaldimines and the like.

Representative organometallic compounds of the Group III–B metals which may be useful in this invention include cerium acetylacetonate, cerium naphthenate, cerium octanoate, tris-salicylaldehydo cerium, cerium tris(8 - hydroxyquinolate), cerium oxalate, cerium ethyl salicylate, lanthanum tris(8-hydroxyquinolate), lanthanum naphthenate, lanthanum octanoate, neodymium acetylacetonate, neodymium octanoate, yttrium acetylacetonate, yttrium octanoate and dysprosium octanoate.

For a high degree of polymerization activity it is believed that the organometallic coordination compound should be soluble in either the solvent or the monomer or the mixutre of solvent and monomers.

The third essential catalyst component of the invention is an organoaluminum fluoride compound which may be represented by the symbol $R_{3-n}AlF_n$, where "$n$" equals 1 or 2; F represents fluorine and R represents an alkyl, cycloalkyl, aryl, alkaryl, arylalkyl radicals and hydrogen. As a hydrocarbon radical R may contain from one to 20 carbon atoms. Representative organoaluminum fluorides include dimethylaluminum fluoride, diethylaluminum fluoride, dipropylaluminum fluoride, dihexylaluminum fluoride, methylethylaluminum fluoride, ethyl-n-butylaluminum fluoride, ethylphenylaluminum fluoride, dibenzylaluminum fluoride, ethylaluminum difluoride, butylaluminum difluoride and phenylaluminum difluoride.

The 1,3-dienes that can be polymerized by the above described catalyst system can be symbolically represented by the general formula:

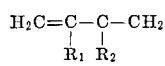

wherein $R_1$ and $R_2$ are selected from the group consisting of hydrogen and alkyl having from one to twelve carbon atoms. Representative but not exclusive of suitable 1,3-dienes, one can mention butadiene-1,3, isoprene, 2,3-dimethyl - 1,3-butadiene, 2 - ethyl-1,3-butadiene, 2-hexyl-1,3-butadiene, 2,3-dibutyl-1,3-butadiene, 2-hexyl - 1,3-butadiene, 2-decyl-1,3-butadiene and the like.

The three components of the catalyst system of this invention must be controlled within definite limits for polymerization to take place. For example, when the mole ratio of fluorine to Group III–B metal (F/Group III–B) is equal to or less than 10:1, the amount of polymer formed is negligible. However, polymerization will occur when the F/Group III–B mole ratio is within the range of 15:1 to 80:1, with the preferred ratios being between 20:1 and 70:1.

The different alkylaluminum and alkylaluminum hydride compounds have various optimum catalyst levels. Although there is no lower limit for these compounds, sufficient compound should be used to promote polymerization. Although there is no upper limit on the amount of alkylaluminum and alkylaluminum hydride catalyst used, a large excess not only results in polymers with low dilute solution viscosities (DSV) but also result in economic waste. It has been found that polymerization will occur when the alkylaluminum or alkylaluminum hydride compound varies between 1 and 50 millimoles of alkylaluminum or alkylaluminum hydride compound per 100 grams of monomer used, with a preferred level being between 2 and 15 millimoles per 100 grams of monomer.

When diisobutylaluminum hydride is used as the organoaluminum compound, the preferred catalyst level ratio varies between 2 and 6 millimoles of diisobutylaluminum hydride compound per 100 grams of monomer. When triisobutylaluminum is used as the organoaluminum compound, the preferred catalyst level varies between 4 and 12 millimoles of triisobutylaluminum compound per 100 grams of monomer.

The catalyst levels of the Group III–B metal may vary over a wide range. Although no lower level is specified, a sufficient amount of Group III–B metal must be used to effect a polymerization to a high cis-1,4 polymer configuration. Although no upper limit is specified, a large amount of the Group III–B metal catalyst results in a gradual lowering of the cis-1,4 configuration of the polymer in proportion to the excess catalyst. This is particularly true when cerium is used as the Group III–B metal. Also, the ash content of the polymer varies directly with the amount of Group III–B metal polymer used. It has ben found that polymerization will occur when the catalyst level of the Group III–B metal varies between 0.05 and 1.0 millimoles of Group III–B metal per 100 grams of monomer. A preferred ratio is between 0.15 and 0.3 millimoles of Group III–B metal per 100 grams of monomer.

The three catalyst coponents may be charged to the polymerization system as separate catalyst components in either a stepwise or a simultaneous manner. Thus, the three catalyst components may be added separately to the premix by first introducing alkylaluminum or alkylaluminum hydride compound and then the Group III–B metal chelate or ligand complex and then adding the organoaluminum fluoride compound. Any other order of addition of the separate catalyst components may be used and polymerization to solid, high cis-1,4-elastomers will still be achieved. The catalyst may also be "preformed" outside the polymerization system whereby all of the catalyst components are mixed in the absence of the monomer to be polymerized, either with or without an inert diluent and the complete catalyst then added to the polymerization system. The preformed catalysts may be permitted to stand for a few hours to "age" before using. The preformed catalysts generally are more active than the in situ catalysts.

The concentration of the total catalyst system employed, of course, depends on factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic and cycloaliphatic hydrocarbons, representative of which are pentane, hexane, heptane, toluene, benzene, cyclohexane, and the like. Preferred solvents are hexane and benzene. The solvent/monomer volume ratio may be varied over a wide range. Up to 20 or more to 1 volume ratio of solvent to monomer can be employed. It is usually preferred, or more convenient, to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 0° C. and about 90° C. Ambient pressures are usually used but higher or lower pressures may be employed.

The practice of this invention is further illustrated by reference to the following examples which are intended to be representative rather than restrictive of the scope of this invention.

EXAMPLE I

A purified butadiene in benzene solution containing 100 grams of butadiene per liter of solution was charged to 4-ounce bottles. Nitrogen was flushed over the surface of this premix while the catalyst was charged in situ in the amounts shown in the table below. The catalyst employed was triisobutylaluminum (TIBAL), cerium octanoate (Ce Oct) and diethylaluminum fluoride (DEAF). The sealed bottles were tumbled end-over-end for 20 hours in a water bath maintained at 50° C. The polymerizations were deactivated by the addition to the system of a suitable stopping agent and an antioxidant. Table Ia reports the catalyst levels charged, the fluoride to cerium atom ratios and the corresponding 20 hour polymer yields.

TABLE Ia
[Benzene solvent—50° C.; Polymerization time=20 hours]

| Exp. No. | Millimole/100 gms. Bd | | | Atom ratio, F/Ce | Polymer yield, weight percent |
|---|---|---|---|---|---|
| | TIBAL | Ce Oct | DEAF | | |
| 1 | 6.0 | .3 | .6 | 2 | (1) |
| 2 | 6.0 | .3 | 1.2 | 4 | (1) |
| 3 | 12.0 | .3 | .3 | 1 | (1) |
| 4 | 12.0 | .3 | .6 | 2 | (1) |
| 5 | 12.0 | .3 | .9 | 3 | (1) |
| 6 | 12.0 | .6 | .6 | 1 | (1) |
| 7 | 12.0 | .6 | 1.2 | 2 | (1) |
| 8 | 12.0 | .6 | 1.8 | 3 | (1) |
| 9 | 6.0 | .15 | 6.0 | 40 | 36.5 |
| 10 | 6.0 | .15 | 12.0 | 80 | 5.0 |
| 11 | 9.0 | .15 | 12.0 | 80 | 6.0 |
| 12 | 6.0 | .3 | 6.0 | 20 | 21.0 |
| 13 | 6.0 | .3 | 9.0 | 30 | 36.0 |
| 14 | 6.0 | .3 | 12.0 | 40 | 40.5 |
| 15 | 9.0 | .3 | 6.0 | 20 | 28.5 |
| 16 | 9.0 | .3 | 9.0 | 30 | 59.0 |
| 17 | 9.0 | .3 | 12.0 | 40 | 62.0 |
| 18 | 12 | .3 | 6.0 | 20 | 83.0 |
| 19 | 12 | .3 | 9.0 | 30 | 91.0 |
| 20 | 12 | .3 | 12.0 | 40 | 93.5 |

1 Negligible.

The data in Table Ia indicate that the fluorine to Group III–B metal (F/Ce) atom ratio is more critical than the other catalyst ratios since significant polymerization will not occur below critical F/Ce atom ratios. The first eight experiments above are added for comparative data.

Table Ib below reports some physical properties such as the type of microstructure and the dilute solution viscosity (DSV) of certain of the polymers obtained from the experiments above.

TABLE Ib (FROM TABLE Ia ABOVE)

| Exp. No. | DSV | IR analysis, percent | |
|---|---|---|---|
| | | Cis-1,4 | Trans-1,4 |
| 9 | 2.89 | 96.6 | 2.5 |
| 10 | 3.98 | | |
| 11 | 3.71 | 94.0 | 3.0 |
| 12 | 2.72 | 95.0 | 3.7 |
| 13 | 2.85 | | |
| 14 | 2.74 | | |
| 15 | 1.84 | 92.4 | 6.5 |
| 16 | 1.90 | | |
| 17 | 1.78 | | |

The polymers produced were solid elastomers of polybutadiene having cis-1,4 contents ranging between 92 and 97% and DSV's ranging between 1.78 and 3.98.

EXAMPLE II

Butadiene was polymerized in a manner similar to that utilized in Example I except that hexane was used as a solvent rather than benzene. Table II reports the fluorine to Group III–B metal atom ratio, catalyst levels charged and resulting 20 hour polymer yields.

TABLE II
[Hexane Solvent—50° C., Polymerization time=20 hours]

| Exp. No. | Millimole/100 gms. Bd | | | Atom ratio, F/Ce | Polymer yield, weight percent |
|---|---|---|---|---|---|
| | TIBAL | Ce Oct | DEAF | | |
| 1 | 6.0 | .3 | 3.0 | 10 | 4 |
| 2 | 6.0 | .3 | 6.0 | 20 | 20 |
| 3 | 6.0 | .3 | 12.0 | 40 | 84 |
| 4 | 9.0 | .3 | 12.0 | 40 | 99 |
| 5[1] | 4.0 | .3 | 6.0 | 20 | 28 |
| 6[1] | 4.0 | .3 | 12.0 | 40 | 87 |
| 7[1] | 6.0 | .3 | 6.0 | 20 | 27 |
| 8[1] | 6.0 | .3 | 12.0 | 40 | 89 |

1 In experiments 5, 6, 7 and 8 diisobutylaluminum hydride (DIBAL-H) replaced TIBAL as the reducing component.

The data of Table II indicates that optimum atom ratios of fluorine to Group III–B metal (F/Ce) are above 20. Experiment 1 in Table II is added for comparative data.

EXAMPLE III

A purified isoprene in hexane solution containing 133 grams of isoprene per liter of solution was charged to 4-ounce bottles. Nitrogen was flushed over the surface of this premix while the catalyst was charged in situ in the amounts shown in the table below. The catalyst system employed was triisobutylaluminum (TIBAL), cerium octanoate (Ce Oct) and diethylaluminum fluoride (DEAF). The bottles were tumbled end-over-end for 20 or 64 hours in a water bath maintained at 50° C. The polymerizations were deactivated by the addition to the system of a suitable stopping agent and an antioxidant. Table III below shows the catalyst level charged, fluorine-to-Group III–B metal atom ratio, resulting polymer yields and in some experiments, the dilute solution viscosity of the resulting polymer.

TABLE III.—ISOPRENE POLYMERIZATION WITH TIBAL CeOct/DEAF

Hexane solvent—50° C.; Polymerization time=20 hours

| Exp. No. | Millimoles/100 gm. isoprene | | | Atom ratio, F/Ce | Polymer yield, weight percent | DSV |
|---|---|---|---|---|---|---|
| | TIBAL | Ce Oct | DEAF | | | |
| 1 | 10 | 0.3 | 0.6 | 2 | 0 | |
| 2 | 10 | 0.3 | 1.5 | 5 | 0 | |
| 3 | 10 | 0.3 | 3. | 10 | 1 | |
| 4 | 10 | 0.3 | 6. | 20 | 40 | 1.85 |
| 5 | 10 | 0.3 | 9. | 30 | 78 | 2.58 |
| 6 | 10 | 0.3 | 12. | 40 | 92 | 2.68 |
| 7 | 10 | 0.3 | 16. | 53 | 95 | 1.77 |

Hexane solvent—50° C.; Polymerization time=64 hours

| 8 | 10 | 0.3 | 0.6 | 2 | 0 | |
| 9 | 10 | 0.3 | 1.5 | 5 | 0.3 | |
| 10 | 10 | 0.3 | 3. | 10 | 11 | |
| 11 | 10 | 1.2 | 3. | 2.5 | 0 | |

Table III indicates that isoprene polymerization is similar to butadiene polymerization in that the optimum fluorine to Group III–B metal catalyst atom ratio is in the neighborhood of 40:1.

EXAMPLE IV

Isoprene was polymerized in a manner similar to that described in Example III except that a lower concentration of trialkylaluminum (TIBAL) was used. Catalyst ratios, catalyst levels and the corresponding polymer yields are shown in Table IV–a. Where a significant yield was obtained, such as in Experiments 6, 7, 8 and 9, the physical properties of the resulting polymers are shown in Table IV–b.

TABLE IVa
Hexane solvent; Polymerization temperature 50° C.

| Exp. No. | Millimoles/100 gm. isoprene | | | Atom ratio, F/Ce | Polymer yield, weight percent |
|---|---|---|---|---|---|
| | TIBAL | Ce Oct | DEAF | | |
| 1 | 5 | 0.25 | 0.50 | 2 | ¹0 |
| 2 | 5 | 0.25 | 1.0 | 4 | ¹0 |
| 3 | 5 | 0.25 | 2.5 | 10 | ¹0 |
| 4 | 5 | 0.25 | 3.75 | 15 | 9 |
| 5 | 5 | 0.25 | 5.0 | 20 | 15 |
| 6 | 5 | 0.25 | 7.50 | 30 | 44 |
| 7 | 5 | 0.25 | 10.0 | 40 | 73 |
| 8 | 5 | 0.25 | 15.0 | 60 | 87 |
| 9 | 5 | 0.25 | 20.0 | 80 | 20 |
| 10 | 5 | 0.25 | 25.0 | 100 | 0 |

¹ Polymerization time is 20 hours except in Experiments 1, 2 and 3 where the time was extended to 64 hours.

Experiments 1, 2 and 3 are shown only for comparative data. The data in Table IVa show that polymerization does not occur when using a F/Ce atom ratio below 10:1. Also, the data indicate that very large F/Ce atom ratios, e.g., 100:1, inhibit polymerization.

TABLE IVb.—(From Table IVa above)

| Exp. No. | DSV | Percent | Percent | Percent |
|---|---|---|---|---|
| 6 | 3.77 | 89 | 4 | 7 |
| 7 | 4.17 | | | |
| 8 | 2.87 | 91 | 3 | 6 |
| 9 | 1.03 | | | |

The data in Table IVb indicate that increasing the amount of the DEAF (diethylaluminum fluoride) catalyst component beyond a F/Ce atom ratio of 40:1 results in a lowering of DSV of the polymer obtained.

The above data indicate that yield, DSV and polymer structure are functions of the polymerization temperature when using the catalyst system of the present invention.

EXAMPLE V

Isoprene was polymerized according to the procedure described in Example III while maintaining the F/Ce atom ratio between 30/1 and 40/1. Table V reports the catalyst ratios, catalyst levels and some physical properties of the resulting polymer.

TABLE V
Hexane solvent: Polymerization temp.—50° C.; Polymerization time—20 hours

| Exp. No. | Millimoles/100 gms. isoprene | | | Atom ratio, F/Ce | Polymer yield, weight percent | DSV |
|---|---|---|---|---|---|---|
| | TIBAL | Ce Oct | DEAF | | | |
| 1 | 3 | 0.25 | 10 | 40 | ¹67 | 5.28 |
| 2 | 5 | 0.25 | 10 | 40 | 73 | 4.17 |
| 3 | 10 | 0.3 | 9 | 30 | 78 | 2.58 |
| 4 | 20 | 0.25 | 10 | 40 | 87 | 1.73 |
| 5 | 40 | 0.25 | 10 | 40 | 82 | 1.26 |

¹ Polymerization time = 12 hours for Experiment 1.

The data in Table V indicate that increasing the amount of TIBAL results in a lowering of DSV of the resulting polymer.

EXAMPLE VI

Isoprene was polymerized according to the procedure used in Example III except that the catalyst ratios and levels were held constant while the temperature of polymerization was changed from 50° C. to 2° C. The results of the polymerization for each extreme of temperature range are given in Table VI below.

TABLE VI
[Catalyst Level: TIBAL/CeOct/DEAF=10/0.3/12 millimoles/10 gm. isoprene; F/Ce atom ratio=40; Solvent—Hexane]

| Exp. No. | Polymerization temp., ° C. | Polymerization time, hrs. | Yield, wt. percent | DSV | Percent cis-1,4 |
|---|---|---|---|---|---|
| 1 | 50 | 20 | 92 | 2.7 | 87.9 |
| 2 | 2 | 40 | 64 | 4.2 | 93.9 |

EXAMPLE VII

Isoprene was polymerized according to the method described in Example III except that a series of different trialkylaluminum compounds were substituted for TIBAL (triisobutylaluminum).

TABLE VII
Hexane solvent; Polymerization temperature—50° C.
Polymerization time was 12 hours except for Control experiment which was 20 hours.
Catalyst level: R₃Al/CeOct/DEAF millimoles/100 gms. isoprene.
Control: 5/0.25/10.0 millimoles/100 gms. isoprene.
Exp. 1 through 3: 5/0.3/12.0 millimoles/100 gms. isoprene.
[F/Ce ratio (all cases)=40]

| Exp. No. | R₃Al | Yield, wt. percent | DSV | IR analysis percent | | |
|---|---|---|---|---|---|---|
| | | | | Cis-1,4 | Trans-1,4 | 3,4 |
| Control | TIBAL¹ | 73 | 4.17 | | | |
| 1 | TNHAL² | 71 | 4.59 | 87 | 6.5 | 6.5 |
| 2 | TIHAL³ | 92 | 1.38 | 89 | 5.5 | 5.5 |
| 3 | TNBAL⁴ | 91 | 3.12 | 89 | 5.0 | 6.0 |

¹ TIBAL=Triisobutylaluminum.
² TNHAL=Tri-(n-hexyl)aluminum.
³ TIHAL=Triisohexylaluminum.
⁴ TNBAL=Tri-(n-butyl)aluminum.

The data of Table VII indicate that the selection of the trialkylaluminum will influence the physical properties of the resulting polymer.

EXAMPLE VIII

Butadiene was polymerized in a manner similar to that used in Example I except that either benzene or hexane was used as a solvent as shown in Table VIIIa below. Table VIIIa reports the catalyst system, catalyst level ratios, and solvent used. Table VIIIb presents the corresponding polymerization results.

TABLE VIIIa
[Polymerization time=20 hours; Temperature=50° C.]

| Exp. No. | Millimoles/100 gms. butadiene | | | Atom ratio, F/Ce | Solvent |
|---|---|---|---|---|---|
| | R¹R²Al | Ce Oct | DEAF | | |
| 1 | ¹12 | 0.3 | 12 | 40 | Benzene. |
| 2 | ¹9 | 0.3 | 12 | 40 | Do. |
| 3 | ¹6 | 0.3 | 12 | 40 | Do. |
| 4 | ¹6 | .15 | 6 | 40 | Do. |
| 5 | ¹9 | .3 | 12 | 40 | Hexane. |
| 6 | ¹6 | .15 | 12 | 80 | Do. |
| 7 | ²3 | .15 | 6 | 40 | Benzene. |
| 8 | ²3 | .30 | 12 | 40 | Do. |
| 9 | ²4 | .3 | 12 | 40 | Hexane. |
| 10 | ²6 | .3 | 12 | 40 | Do. |

¹ TIBAL.
² DIBAL-H.

TABLE VIIIb

| Exp. No. | Yield, wt. percent | DSV | IR, percent structure | |
|---|---|---|---|---|
| | | | Cis-1,4 | 1,2 |
| 1 | 94 | 1.8 | | |
| 2 | 62 | 2.7 | 94.6 | 1.4 |
| 3 | 41 | 3.7 | 94.0 | 3.0 |
| 4 | 37 | 2.9 | 96.6 | 0.9 |
| 5 | 99 | 3.4 | 92.3 | 0.8 |
| 6 | 84 | 4.6 | 94.7 | 0.7 |
| 7 | 49 | 2.6 | 97.4 | 0.8 |
| 8 | 70 | 2.4 | 97.6 | 0.9 |
| 9 | 87 | 1.73 | 92.1 | 0.8 |
| 10 | 89 | 1.77 | | |

Example VIII indicates that the catalyst system of the present invention produces a high cis-1,4 polybutadiene when the proper catalyst ratios are used. The data also reveal that polymer yields, DSV's and percentages of cis- 1,4 are affected by selection of catalysts, catalyst levels, catalyst ratios and solvents.

While certain representative embodiments and details have been shown for the purpose of illustrating the invention, it will be apparent to those skilled in this art that various changes and modifications may be made therein without departing from the spirit or scope of the invention.

What is claimed is:

1. The process which comprises polymerization of at least one diolefin of the general formula:

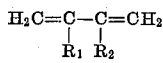

wherein $R_1$ and $R_2$ are selected from the group consisting of hydrogen and an alkyl radical having from 1 to 12 carbon atoms, by contacting said diolefin, under solution polymerization conditions, with a catalyst system comprising (1) at least one compound responding to the formula

in which $R_1$ is selected from the group consisting of alkyl (including cycloalkyl), alkoxy, aryl, alkaryl, arylalkyl radicals and hydrogen; $R_2$ and $R_3$ being selected from the group of alkyl (including cycloalkyl), aryl, alkaryl, and arylalkyl radicals varying between 1 and 50 millimoles per 100 grams of monomer, (2) an organometallic compound, the metal of which is selected from the class comprising metals of Group III–B of the Periodic System and (3) at least one organometallic compound of the formula $R_{3-n}AlF_n$, where $n$ equals 1 or 2; F represents fluorine and R represents an alkyl, cycloalkyl, aryl, alkaryl, arylalkyl radicals and hydrogen, in which the atom ratio of fluoride to Group III–B metal ranges from about 20/1 to about 70/1.

2. The process according to claim 1 in which the diolefin polymerized is butadiene-1,3.

3. The process according to claim 1 in which the diolefin polymerized is isoprene.

4. The process according to claim 1 in which the diolefin polymerized is a mixture of isoprene and butadiene.

5. The process according to claim 1 wherein the alkylaluminum compound is triisobutylaluminum.

6. The process according to claim 1 wherein the alkylaluminum hydride is diisobutylaluminum hydride.

7. The process according to claim 1 wherein the organometallic compound of Group III–B metal is cerium octanoate.

8. The process according to claim 1 wherein the organoaluminum fluoride compound is diethylaluminum fluoride.

9. A catalyst comprising (1) at least one compound responding to the formula

in which $R_1$ is selected from the group consisting of alkyl (including cycloalkyl), alkoxy, aryl, alkaryl, arylalkyl radicals and hydrogen; $R_2$ and $R_3$ being selected from the group of alkyl (including cycloalkyl), aryl, alkaryl, and arylalkyl radicals varying between 1 and 50 millimoles per 100 grams of monomer, (2) an organometallic compound, the metal of which is selected from the class comprising metals of Group III–B of the Periodic System and (3) at least one organometallic compound of the formula $R_{3-n}AlF_n$, where $n$ equals 1 or 2; F represents fluorine and R represents an alkyl, cycloalkyl, aryl, alkaryl, arylalkyl radicals and hydrogen, in which the atom ratio of fluoride to Group III–B metal ranges from about 20/1 to about 70/1.

10. The composition according to claim 9 wherein the organoaluminum fluoride compound is diethylaluminumfluoride (DEAF) and the organometallic compound of Group III–B metal is cerium octanoate.

References Cited

UNITED STATES PATENTS

| 2,953,531 | 9/1960 | Anderson et al. | 252—429 |
|---|---|---|---|
| 3,056,770 | 10/1962 | D'Alelio | 260—94.3 |
| 3,060,161 | 10/1962 | D'Alelio | 260—93.5 |
| 3,075,957 | 1/1963 | D'Alelio | 260—93.1 |
| 3,090,776 | 5/1963 | D'Alelio | 260—93.7 |
| 2,907,757 | 10/1959 | Merckling | 260—94.9 |
| 3,384,678 | 5/1968 | Stapp | 260—683.15 |
| 3,429,864 | 2/1969 | Stapp | 260—94.9 |

JOSEPH L. SCHOFER, Primary Examiner

R. A. GAITHER, Assistant Examiner

U.S. Cl. X.R.

252—431; 260—94.3

PO-1050
(5/69)

UNITED STATES PATENT OFFICE
CERTIFICATE OF CORRECTION

Patent No. U S Patent 3,541,063    Dated November 17, 1970

Inventor(s) Morford C Throckmorton and William M Saltman

It is certified that error appears in the above-identified patent and that said Letters Patent are hereby corrected as shown below:

Column 2, line 46, "p-tolylisopropylaluminum" is misspelled.

Column 2, line 67, "liquids" should read -- ligands --.

Column 3, line 4, "teribium" should read -- terbium --.

Column 3, line 37, "mixture" is misspelled.

Column 4, line 31, "been" is misspelled.

Column 6, line 58 (Table III) should read --ISOPRENE POLYMERIZATION WITH TIBAL/CeOct/DEAF --.

Column 7, under Table IVb, the titles for the last three colu should read -- Percent Cis 1,4 --,
-- Percent Trans 1,4 --, and
-- Percent 3,4 -- respectively.

Column 7, lines 45-58 are misplaced and should be inserted af "table VI" and before "Example VIII" in col Column 8, line 49, (Table VIIIa), "R$^1$R$^2$" should read -- R$_1$R$_2$ Signed and sealed this 30th day of March 1971.

(SEAL)
Attest:

EDWARD M. FLETCHER, JR.
Attesting Officer

WILLIAM E. SCHUYLER, JR.
Commissioner of Patents